(12) United States Patent
Ezquerra-Moreu et al.

(10) Patent No.: US 6,947,495 B2
(45) Date of Patent: Sep. 20, 2005

(54) METHOD FOR ESTIMATING AND REMOVING A TIME-VARYING DC-OFFSET

(75) Inventors: Angel Ezquerra-Moreu, Villeneuve-Loubet (FR); Pascal Audinot, Valbonne (FR)

(73) Assignee: Texas Instruments Incorporated, Dallas, TX (US)

( * ) Notice: Subject to any disclaimer, the term of this patent is extended or adjusted under 35 U.S.C. 154(b) by 669 days.

(21) Appl. No.: 09/962,643

(22) Filed: Sep. 25, 2001

(65) Prior Publication Data

US 2003/0058964 A1 Mar. 27, 2003

(30) Foreign Application Priority Data

Oct. 30, 2000 (EP) .............................................. 00403018

(51) Int. Cl.[7] .......................... H04L 25/06; H04L 25/10
(52) U.S. Cl. ...................................... 375/319; 375/317
(58) Field of Search .............................. 375/319, 285, 375/317

(56) References Cited

U.S. PATENT DOCUMENTS

| 3,953,805 | A |   | 4/1976  | Couvillon |         |
|-----------|---|---|---------|-----------|---------|
| 4,091,453 | A | * | 5/1978  | Martin    | 708/813 |
| 4,155,087 | A | * | 5/1979  | Okrent    | 342/6   |
| 5,241,702 | A | * | 8/1993  | Dent      | 455/278.1 |
| 5,422,889 | A | * | 6/1995  | Sevenhans et al. | 370/442 |
| 5,459,679 | A | * | 10/1995 | Ziperovich | 708/3 |
| 5,541,597 | A | * | 7/1996  | Chi-Mao   | 341/118 |
| 5,579,347 | A |   | 11/1996 | Lindquist et al. |  |
| 5,760,629 | A | * | 6/1998  | Urabe et al. | 327/307 |
| 5,793,817 | A | * | 8/1998  | Wilson    | 375/297 |
| 5,838,735 | A |   | 11/1998 | Khullar   |         |
| 2002/0029132 | A1 | * | 3/2002 | Takahashi | 702/191 |
| 2002/0075013 | A1 | * | 6/2002 | Schell    | 324/620 |
| 2002/0137487 | A1 | * | 9/2002 | Yochem    | 455/303 |

FOREIGN PATENT DOCUMENTS

| EP | 0 594 894 A1 | 5/1994 |           |
|----|--------------|--------|-----------|
| EP | 0 594 894 B1 | 3/1999 |           |
| GB | 2334187 A    | * 8/1999 | H04L/27/20 |

* cited by examiner

*Primary Examiner*—Stephen Chin
*Assistant Examiner*—Jia W. Lu
(74) *Attorney, Agent, or Firm*—Ronald O. Neerings; Wade James Brady, III; Frederick J. Telecky, Jr.

(57) ABSTRACT

A method for estimating and removing a time varying DC-offset includes the steps of dividing the received burst into blocks (902), then finding the maximum and minimum values in each block (904). Once the maximums and minimum values have been found, the upper and lower envelopes are determined (906). The DC-offset path is then calculated by taking the average of the upper and lower envelope (908). Once determined, the DC-offset path information is used in order to subtract the DC-offset from the desired signal.

9 Claims, 9 Drawing Sheets

US 6,947,495 B2

METHOD FOR ESTIMATING AND REMOVING A TIME-VARYING DC-OFFSET

TECHNICAL FIELD

This invention relates in general to the field of communications, and more specifically to a method of removing a time varying DC-offset.

BACKGROUND

Receivers based on the direct conversion architecture are very appealing because they require fewer components and therefore are less complex than traditional super-heterodyne receivers. Direct conversion receivers however suffer from a very serious problem, which is DC-offset. Direct conversion receivers take a radio frequency (RF) signal and translates it into base-band. So if there is any DC-offset added to the received signal by the mixer (or any other component in the receiver), the DC component of the received signal will be lost because there is no intermediate frequency (IF) filter. Direct conversion receivers are very susceptible to the presence of inteferers (blocking signals within the receive band) that through self-mixing can produce a DC-offset that is added to the received signal.

If the received signal has zero mean, and the DC-offset remains constant, it is possible to solve this problem by averaging the received signal along a sufficiently long period, and then removing that average from the received signal. The DC-offset problem worsens when the DC-offset varies with time. If the DC-offset variation is slow, it is possible to update the estimated DC-offset by repeating the averaging process after a certain period or in a continuous manner. Temperature changes, etc can cause slow variations of the DC-offset. However, if the DC-offset varies too fast, the former procedure will stop working, because a signal can have zero mean over its total duration, but locally it will not have zero mean unless the signal is constant and zero. When the DC-offset changes very fast, it is called a time-varying or dynamic DC-offset, as opposed to the static or slowly-varying DC-offset which can be solved using a technique as described in U.S. Pat. No. 5,422,889 and entitled Offset Correction Circuit.

Because a blocking signal can appear at any time, the DC-offset component that will be added to the received signal can also appear at any time. As a consequence it is called "dynamic" DC-offset, because it will change depending on the arrival time of the blocking signal. This phenomenon is usually referred to as AM suppression. A typical dynamic DC-offset profile is shown in FIG. 2 for the I (in-phase) component of the signal. Signal 202 shows a GMSK I signal which is the desired signal. Signal 204 is the distorted signal having been affected by a DC offset. Line 206 highlights the dynamic DC-offset. The AM delay is shown by line 208, while the AM level is shown by line 210.

In the presence of a time varying DC-offset, the receiver performance degrades quite a bit with the amount of degradation depending on the DC-offset variation and the speed of the variation. That is why solving for time-varying DC-offset problems is one of the more critical problems to be resolved in a direct conversion receiver. One of the main reasons for the apparition of time-varying DC-offsets in TDMA direct conversion (also called homodyne) receivers is the presence of TDMA interferes, that through self-mixing or even order non-linearities, can produce a DC-offset that is added to the received signal. This is something that does not happen with super-heterodyne receivers. Because such an interferer can appear at any time, the DC-offset component that it will add to the received signal can also appear at any time. As a consequence, it is called a "time-varying" DC-offset, because it will change depending on the arrival time of the interfering signal.

Currently one of the most successful wireless communication systems in the world is the GSM system. GSM devices, such as portable radiotelephones (also called hand-held devices), must pass tests to prove conformance with the GSM standard. One of those tests is called the "AM suppression test". To pass the AM suppression test, the bit error rate (BER) performance of the handheld must not be degraded significantly in the presence of a very powerful TDMA interferer signal. It is clear from the previous explanation that a homodyne receiver will not be able to pass the AM suppression test if the receiver does not implement a good time-varying DC-offset correction method, because the interferer signal will generate a time-varying DC-offset that will be added to the received signal. A need thus exist in the art, for a method for correcting for a time varying DC-offset.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
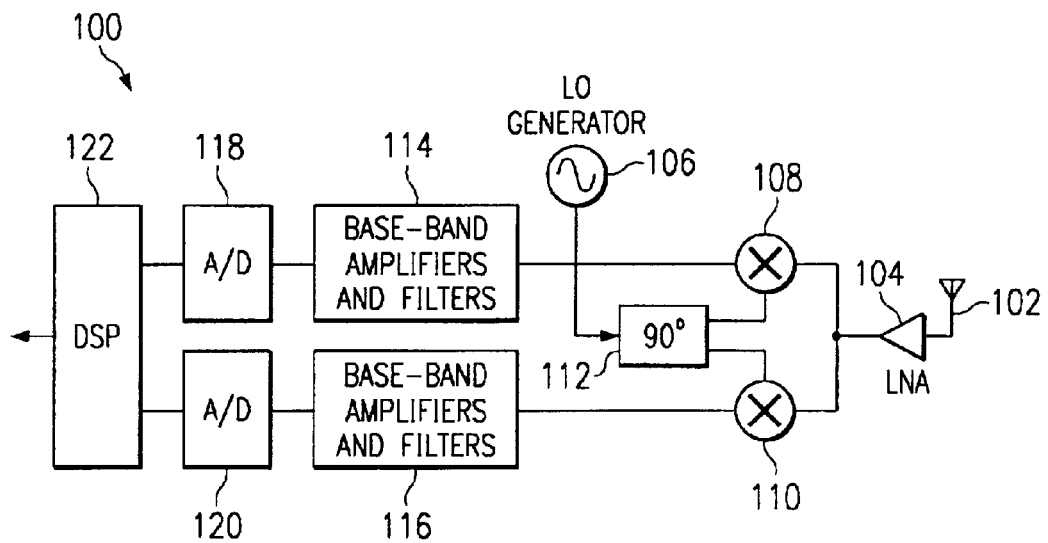
FIG. 1 shows a block diagram of a direct conversion receiver in accordance with the invention.

While the specification concludes with claims defining the features of the invention that are regarded as novel, it is believed that the invention will be better understood from a consideration of the following description in conjunction with the drawing figures, in which like reference numerals are carried forward. Although the preferred embodiment of the present invention will be described in association with a GSM system, the present invention may be used for any other communication systems.

Because a controller such as a digital signal processor (DSP) (as shown in FIG. 1) preferably executes the method of the present invention, the method works with the samples of the received signal. In accordance with the invention, an estimation of the DC-offset will be calculated, and the estimation will be referred to as the "estimated offset path".

The estimation is done by taking account the fact that if there is any dynamic DC-offset present on a burst, both the upper and lower envelopes of the signal will be affected in the same way. The envelope is a trace that follows the upper (and the lower) part of a signal, and which has the same "visual form" of the signal. The signal must be "packed" inside the upper and lower envelopes. In this first step, the lower and upper envelopes of the signal are estimated, and they are averaged as will be explained below. It is necessary for the received signal to have zero mean and the envelope of the signal should change slowly compared to the signal's bandwidth.

Figure 3:
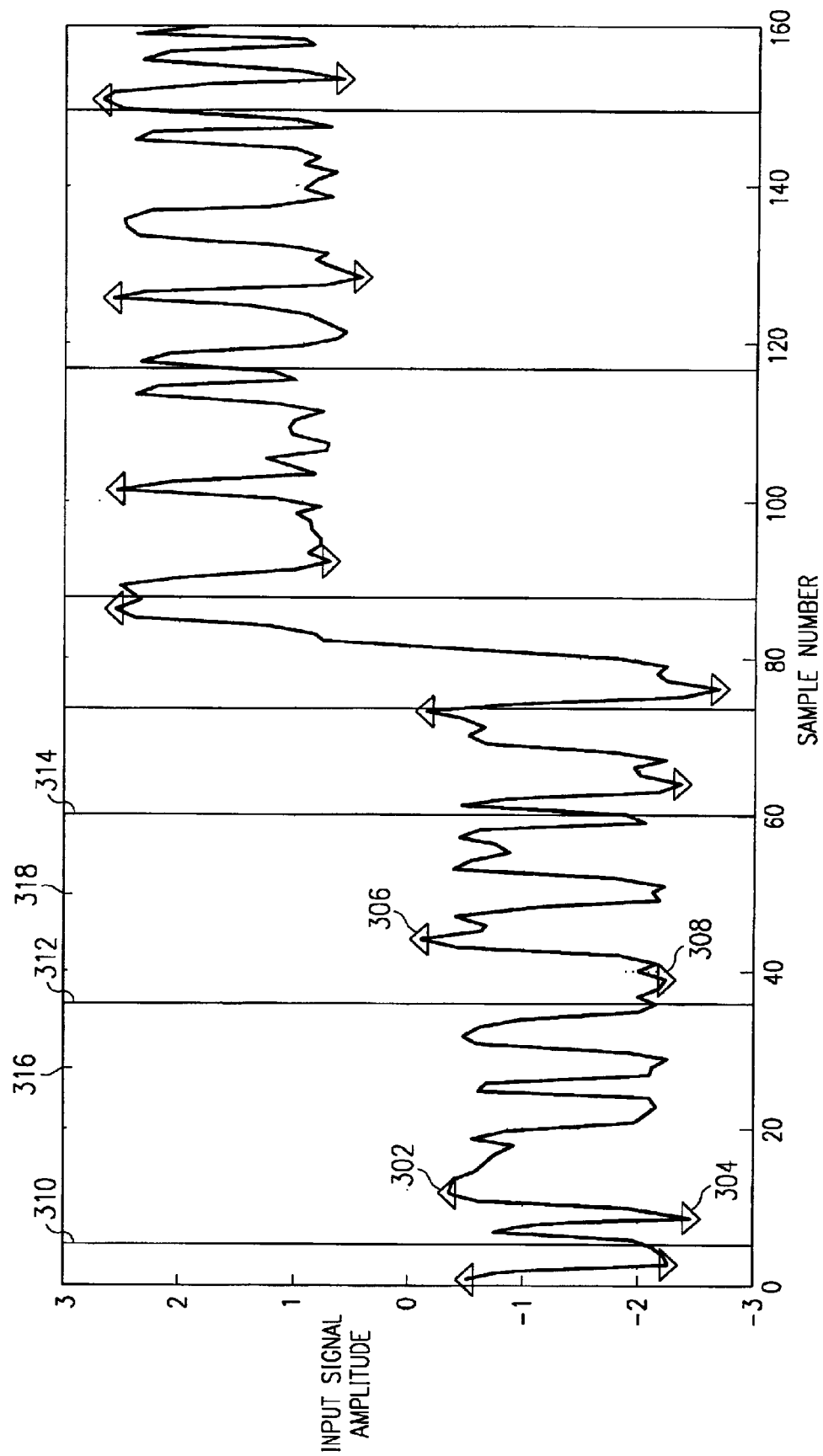
FIG. 3 shows the results of dividing a burst into blocks and finding the maximum and minimum values in each block for one component (in-phase) of the signal in accordance with the invention.

To estimate the upper and lower envelopes of the signal, each burst is divided into several blocks as highlighted in FIG. 3. One block 316 is shown between line 310 and 312, while another block 318 is located between lines 312 and 314. In the preferred embodiment, the sizes of the blocks are chosen after careful evaluation of the typical GSM GMSK modulated signals, in order to minimize the error probability. A similar thing can be done for other non-GSM systems. Alternatively, a constant block size can be used throughout the process. However, a constant block size although easier to implement and execute, may not provide optimal performance. Within each block, the maximum and minimum samples are searched for. Both the value and position of these maximum and minimum samples are stored in memory. Referring to FIG. 3, minimum sample 304 and maximum sample 302 are the maximum and minimum values found in block 316, while sample 306 and 308 are the maximum and minimum samples found within block 318. The maximum valued samples will be used to estimate the upper envelope of the signal, while the minimum values will serve to estimate the lower envelope. The process to estimate both envelopes will be symmetrical (i.e., where a "bigger than" analysis is used for the upper envelope, and a "lower than" analysis will be used for the lower envelope).

The algorithm used to estimate this estimated DC-offset path takes advantage of the fact that a GMSK signal has a zero mean. So if there is any dynamic DC-offset present on a burst, both the upper and lower envelopes of the signal will be affected in the same way. The method of the present invention estimates the lower and upper envelopes of the signal, and calculates the mean of those two envelopes. That mean is the first estimate of the offset path.

In order to estimate the upper and lower envelopes, the following steps are taken:

1. Divide the burst into "N" blocks (if a constant block size is being used, divide into "N" blocks of Nsample/Nsamples); and 2. Calculate the maximum and the minimum samples within each block, and save their position and their value in two arrays, labeled, "vMax" and "vMin".

The objective of these first two substeps is to calculate a "pattern" which the envelopes follow (the envelopes must pass through the points in vMax and vMin). Once this is done the "instantaneous envelopes" are estimated using vMax and vMin as the starting points. This is done in the following manner:

3. For each pair of consecutive maximums from vMax the following is done:
   a). The smaller maximum, is referred to as max1, while the other, larger one is called max2;
   b). Define a value called "currentMax" and set it equal to max1; and
   c). For each sample between max1 and max2, starting at max1 and going towards max2, perform the following further steps:
      1. Compare each sample with the currentMax;
      2. If a sample is bigger than currentMax, set currentMax to the value of that sample; and
      3. Set the value of the instantaneous upper envelope (vInstMax) at that sample position equal to currentMax.

4) Repeat the same procedure for vMin:
   a). Name the larger minimum "min1", while the other, smaller one is called "min2";
   b). Define a value called "currentMin" and set it to "min1"; and
   c). For each sample between min1 and min2, starting at min1 and going towards min2:
      1. Compare each sample with currentMin;
      2. If a sample is smaller than currentMin, set currentMin to the value of that sample; and
      3. Set the value of the instantaneous lower envelope (vInstMin) at that sample position to currentMin.

Figure 4:
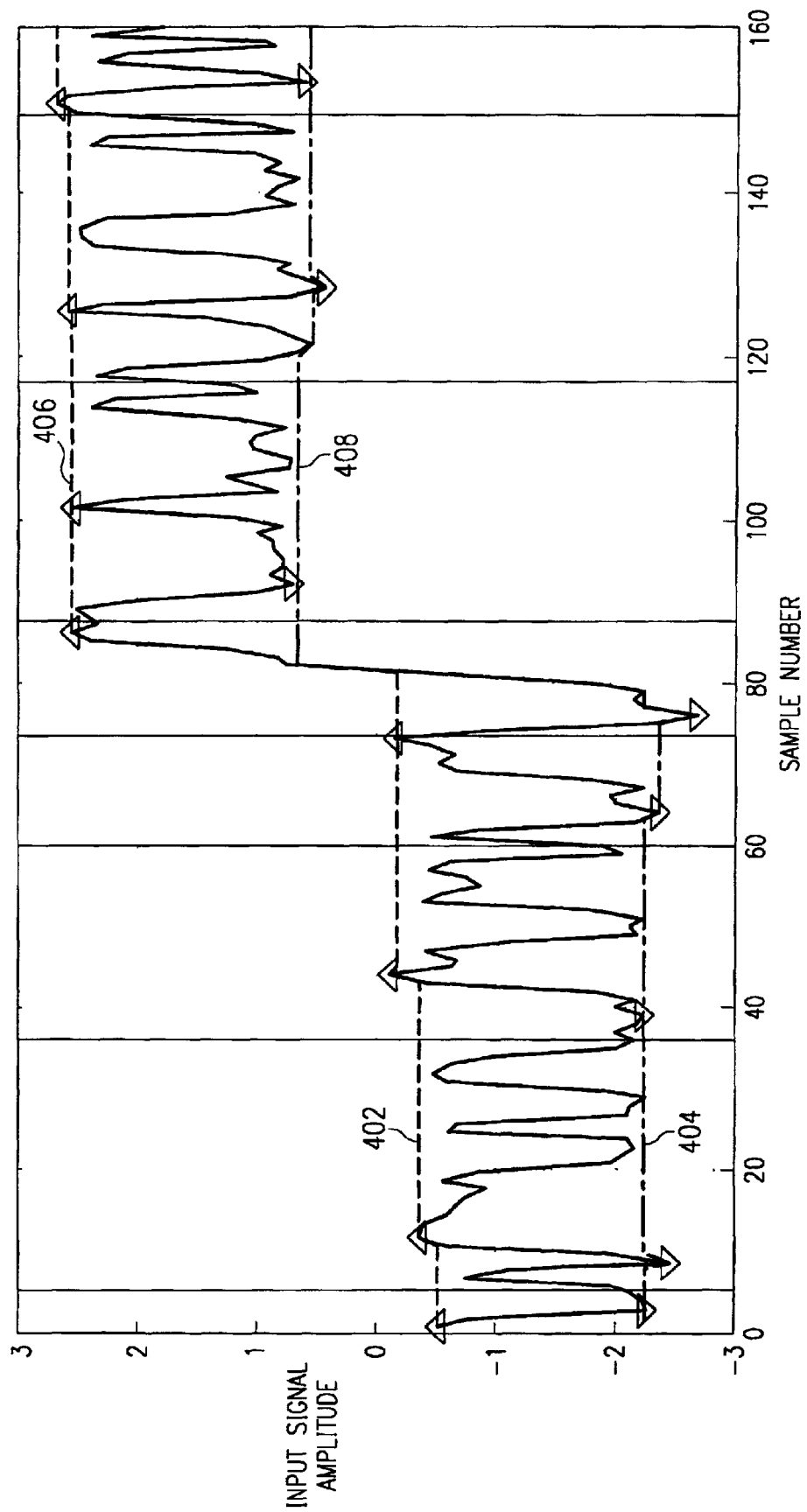
FIG. 4 shows the results of calculating the values of the instantaneous upper and lower envelopes in accordance with the invention.
Figure 5:
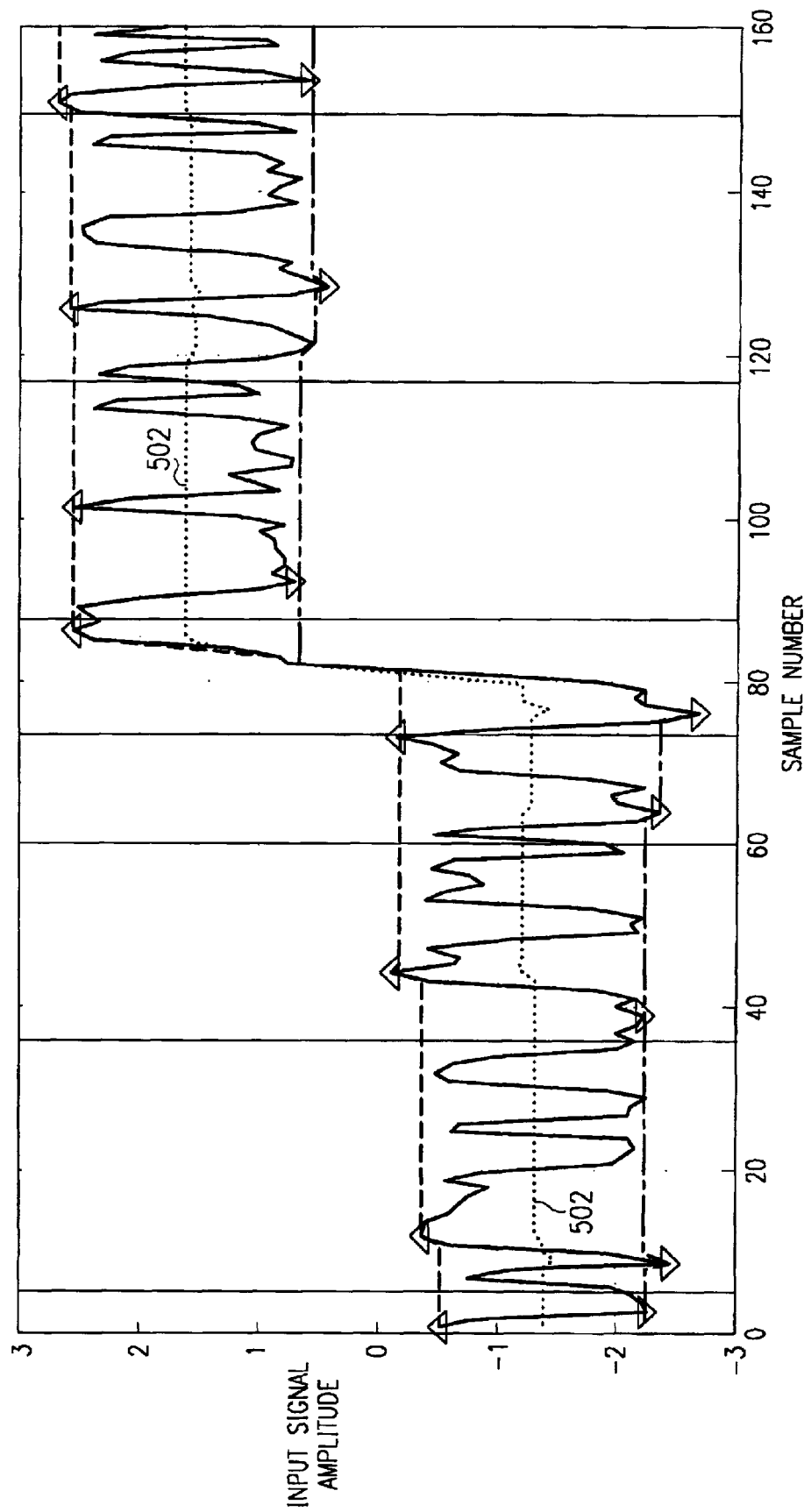
FIG. 5 shows the results of calculating the time varying offset path in accordance with the invention.

As a result of the previous steps, and if the number of blocks (and therefore the block size) is chosen correctly, a very good estimation of the upper and lower envelopes can be determined as shown in FIG. 4. Lines 402 and 406 (vInstMax vector) defines the upper envelope and lines 404 and 408 (vInstMin vector) defines the lower envelope. In FIG. 5 the estimated DC-offset path 502 calculated in accordance with the present invention is shown. The DC-offset path 502 is determined using the following equation:

$$V\text{OffsetPath} = (v\text{InstMax} + v\text{InstMin})/2 \qquad \text{Equation 1}$$

Once the DC-offset path is determined it can be provided to an offset correction circuit which can remove the estimated DC-offset from the received signal. One of a number of DC-offset correction circuits can be used to accomplish this, for example, a circuit that subtracts the DC-offset from the wanted signal.

If the block size chosen is too small, the algorithm can fail. If the block size is smaller than the maximum number of consecutive +1 or −1 samples, the envelope will not be estimated correctly. Thus it is very important that the block size is always bigger than that maximum number of consecutive equal-valued samples (this does not mean they have exactly the same value, but the same level, high or low). This will be referred to as a "sample suite". If the block size is too large, one of the two envelopes might be not correctly estimated.

When the AM suppression appears close to the burst boundaries, the algorithm may fail. This will happen if the AM suppression is closer to the burst boundaries than the block size. In order to select the appropriate block size, simulations are performed whose purpose is to find what is the probability of a burst containing a certain number of consecutive samples with the same value. The simulation in the preferred embodiment was performed using a GMSK signal having 2080 bursts and each burst had 148 meaningful (data) bits.

Figure 6:
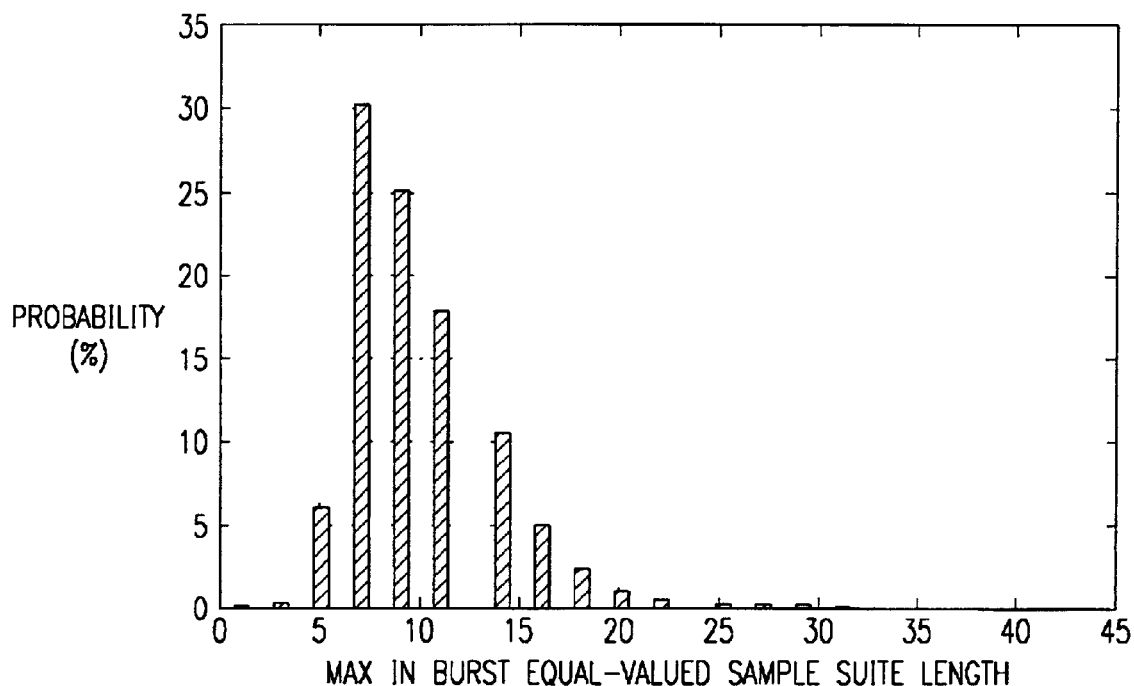
FIG. 6 shows a probability distribution function graph highlighting the probability of a burst containing certain number of consecutive samples with the same value.
Figure 2:
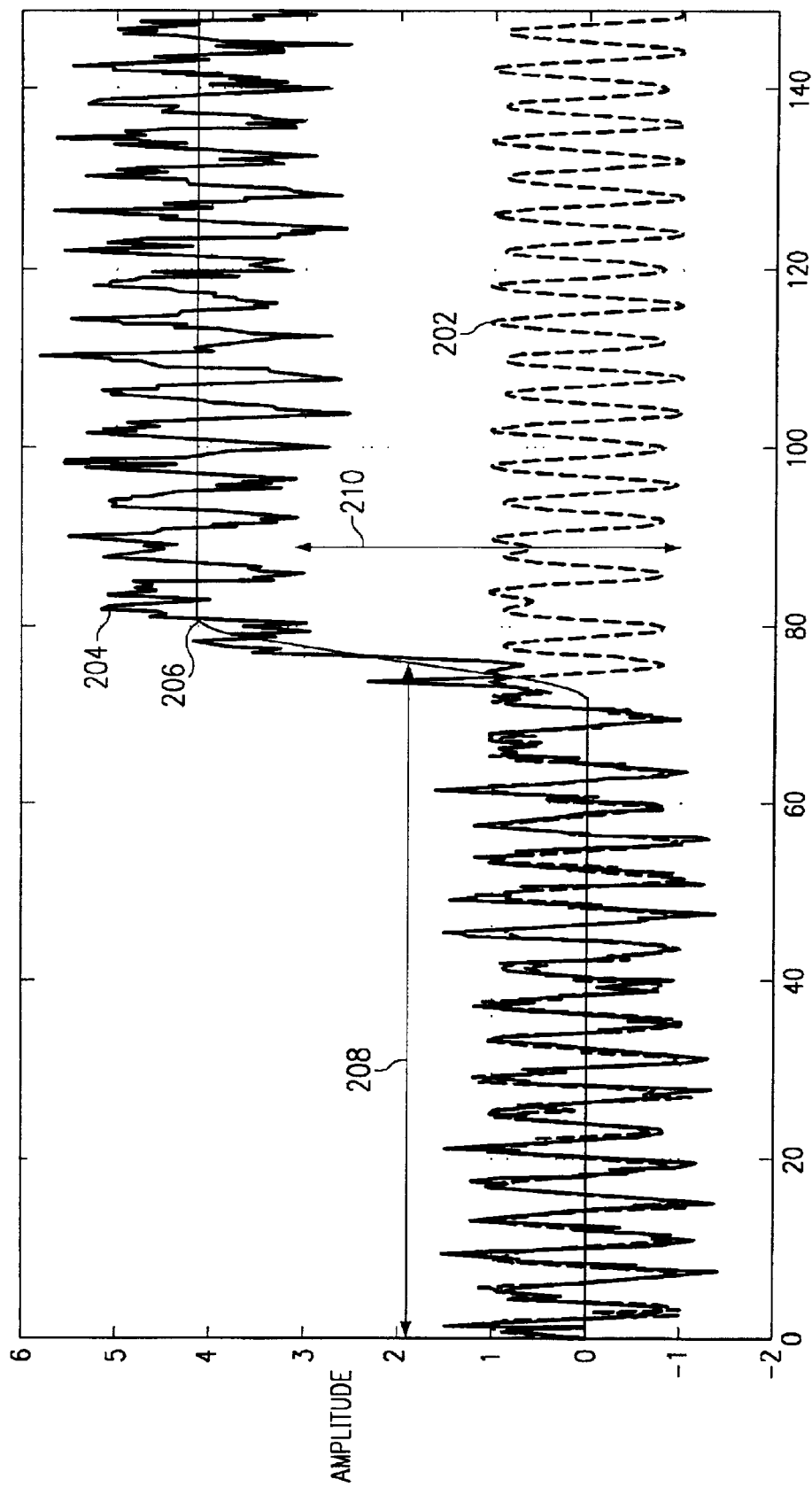
FIG. 2 shows a typical dynamic DC-offset profile.

As shown in FIG. 6, the simulations showed that the longest suite was 43. However, this occurred only once. Most bursts did not have suites of equal-valued bits longer than 14 bits. Given the simulation results, the probability of having a suite smaller than 15 samples was calculated to be about 90%. If one assumes that the maximum suite length is 21, the probability reaches 99%, if one wants to be extra safe, then a maximum suite length of 27 can be assumed with a probability of 99.9%. To avoid a bad estimation of the envelope, the block size must be bigger than the maximum equal-valued sample suite. However, if such a suite happens between two blocks, its effect will be split between those two blocks. Therefore, the possibility of committing an error for block sizes such as 14 or 21 is even smaller.

When a blocking signal arrives close to the burst boundaries, it will not be properly detected if the block size is too large, as mentioned previously. A solution for this problem is to have different block sizes for the burst extremes than for the middle of the burst. From the above discussion it was determined that it is very unlikely that within a burst there will be a suite of bits longer than 13. It is even more unlikely for that suite to happen at the beginning or the end of the burst. A simulation was performed to determine the longest suites occurring at the beginning and ending of a burst.

It is worth noting that in every GSM burst 3 tail bits mark the beginning and the end of each burst. When these tail bits are modulated, the result is that there are two equal-valued samples followed by a different sample on the I path of the receiver, while the first two samples are different on the Q path. As a consequence, there is a need to be sure that on the first and last blocks there will be at least two samples with different levels. After that, data bits begin to be received, and therefore, the values of the samples will be different at each burst. The simulations performed determined that 90% of the time there is a change of the sample level within the first 8 samples of the burst after the tail. The change occurs 99% of the time before the $16t^h$ sample, and 99.2% of the time before the $22^{nd}$ sample. Similar results were obtained for the end of the burst.

Figure 7:
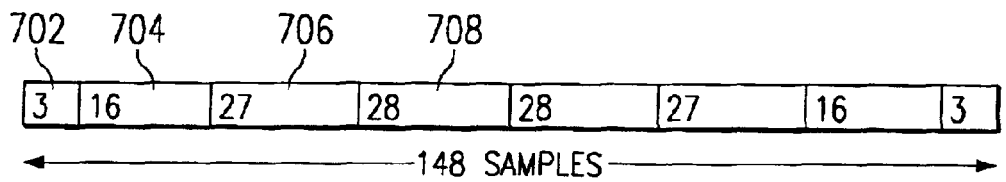
FIG. 7 shows a sample burst divided into several blocks of different sizes.
Figure 8:
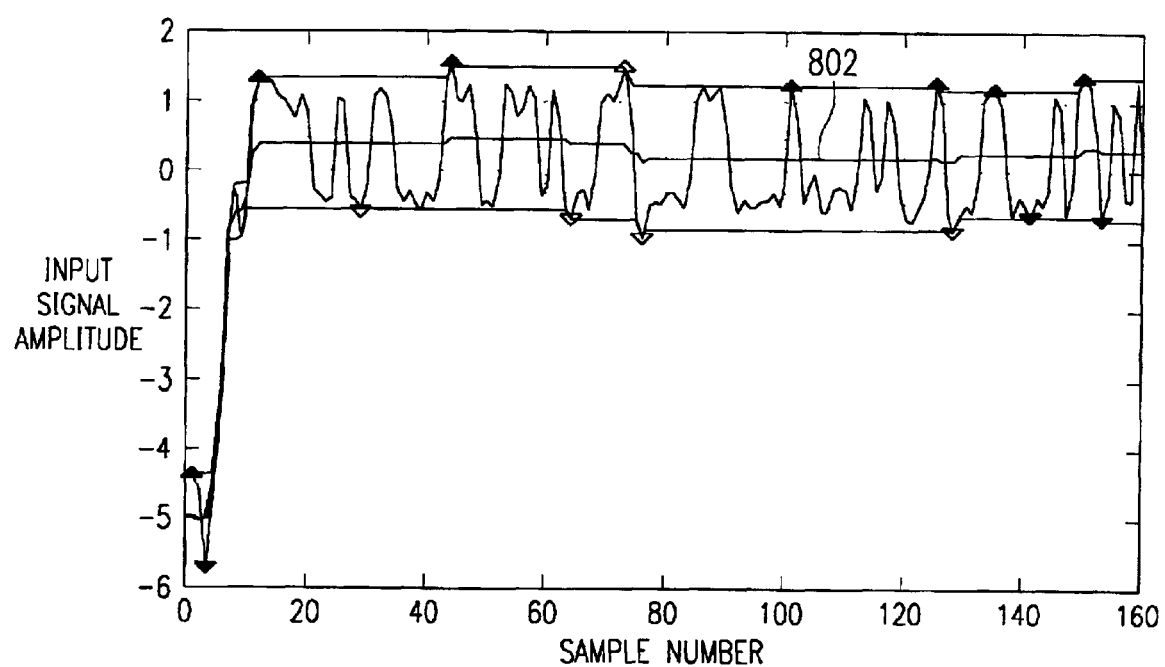
FIG. 8 shows the calculation of the time varying offset path for the upper envelope portion of the burst using variable block sizes in accordance with one embodiment of the present invention.

Given the simulation results noted above, the burst is preferably divided into several blocks of different sizes as shown in FIG. 7. By dividing the burst into blocks as shown in FIG. 7, it is possible to correctly estimate the envelope of the burst when a blocking signal arrives very close to the burst border. The results of using the variable block size technique described above to estimate the envelope and the offset path 802 are shown in FIG. 8.

Figure 9:
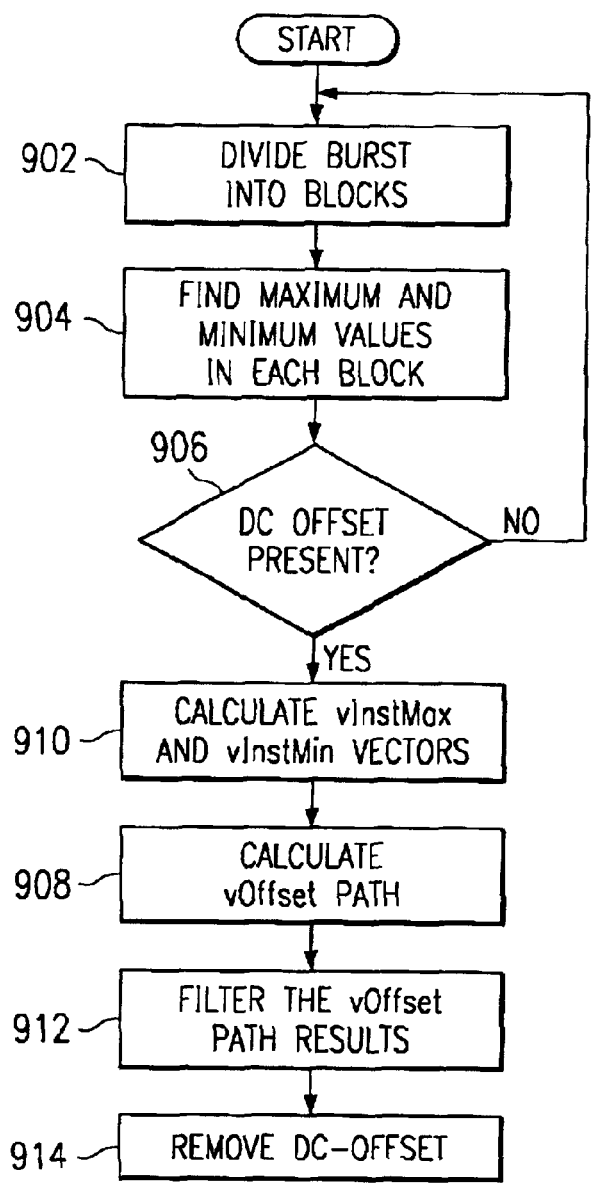
FIG. 9 shows a flowchart highlighting the steps taken to estimate and remove the DC-offset in accordance with the invention.

A flowchart showing the major steps taken in accordance with the preferred embodiment is shown in FIG. 9. In step 902, a GSM burst is divided into blocks, while in step 904 the maximum and minimum samples are found in each block. In step 906, it is determined if a DC offset is present, if there is a DC offset present, the routine continues on to step 908. One technique for determining if a DC offset is present that can be used is to compare the differences between the maximum and minimum values in each block, and then find the median of the differences. If any block has a difference a predetermined amount (e.g., 40%) above the median, then it is assumed that a DC offset is present. There is a tradeoff in setting the threshold level at a predetermined amount which indicating whether or not a DC-Offset is present. On the one hand, if the threshold is set to high, some DC-Offsets may be missed, while if the threshold is set too low, the receiver's performance may be affected. Other techniques for determining if a DC offset is present can also be used in this step.

In step 908, the vInstMax and vInstMin vectors are calculated as described above. Once the vInstMax and vInstMin vectors are calculated in step 908, they are used to calculate the variable offset path (vOffsetPath) using equation 1 (or using another DC offset estimation technique if another DC-Offset estimation method is used) in step 910. The vOffsetPath result is preferably filtered in step 912 to smooth out small glitches that could be left after the averaging of vInstMax and vInstMin due to noise or interference. A sliding averaging window of a predetermined size, for example size five can be used. Once the offset path information is determined, the information can be provided to a DC offset circuit in step 914 in order to remove the DC offset component.

FIG. 1 shows a simplified block diagram of a radio receiver 100 in accordance with the invention. Receiver 100 includes an antenna 102 for receiving a RF signal and received RF signal is preferably band pass filtered (filter not shown) and then low noise amplifier 104 amplifies the filtered signal. The filtered signal is then down-converted to base band in an in-phase (I) and a quadrature phase (Q) channel by mixers 108 and 110. A local oscillator signal (LO) is provided by LO generator 106.

The LO signal form generator 106 is provided to a divider and phase shifter 112. The outputs of the divider and phase shifter 112 are feed to mixers 108 and 110. The I and Q signals produced by mixers 108 and 110 are filtered and amplified by base band amplifier and filter blocks 114 and 116. The amplified signals are then sent to analog-to-digital (A/D) converters 118 and 120 for conversion into digital signals and the digital signals are provided to a controller such as a digital signal processor (DSP) 122. In accordance with the preferred embodiment, the DSP 122 carries out the task of executing the algorithm to implement the offset path estimation and DC-offset removal of the present invention. It is worth noting that although a DSP has been used to perform the estimation and removal steps given its usefulness in performing such steps, other well known hardware circuits or devices can perform the required tasks.

Figure 10:
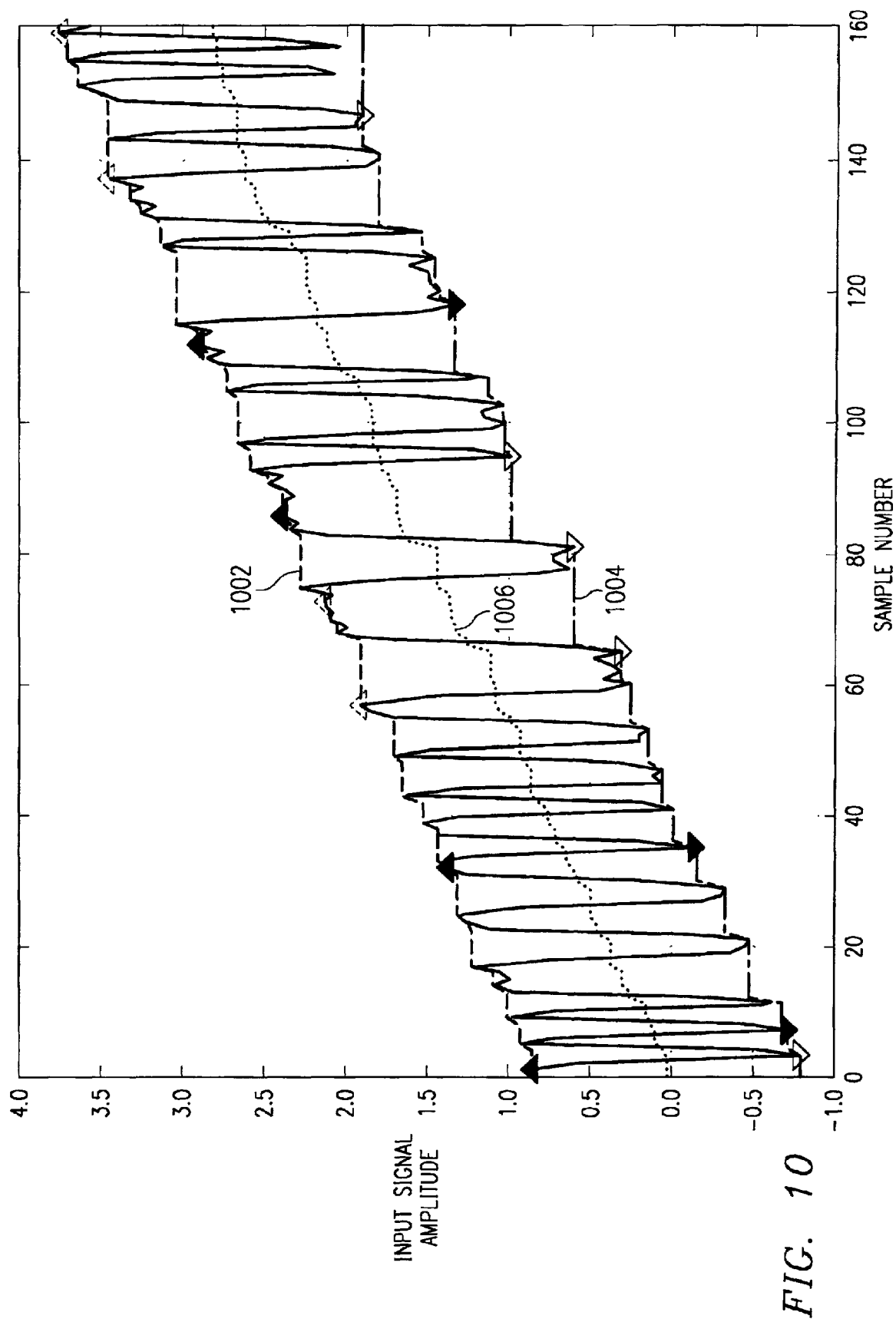
FIG. 10 shows the results of a DC-offset estimation of a ramp-like DC-offset using the estimation method of the present invention.
Figure 11:
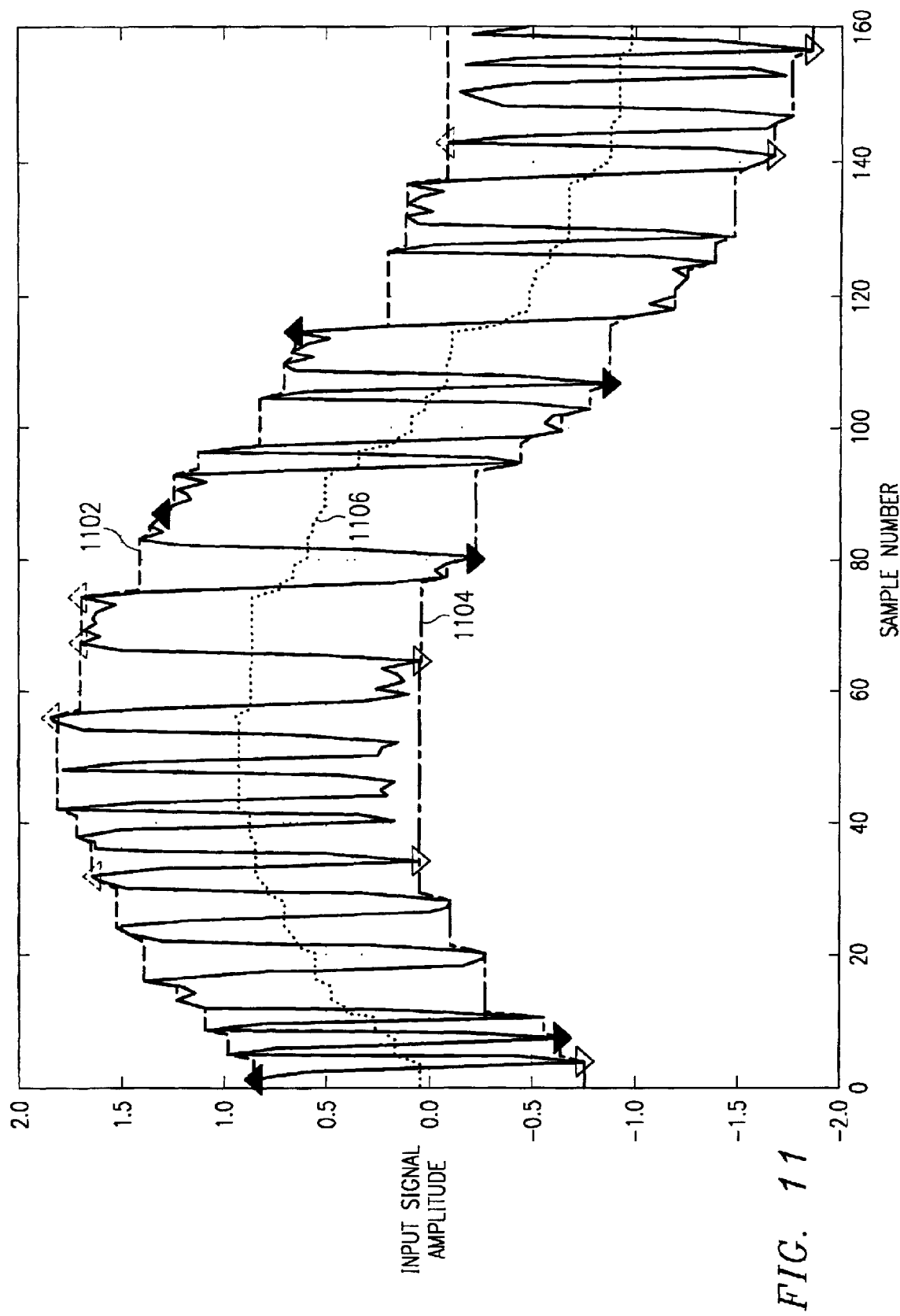
FIG. 11 shows the results of a DC-offset estimation of a sinusoidal DC-offset using the estimation method of the present invention.

In FIG. 10 there is shown a graph showing the results of using the DC offset path estimation technique on a ramp-like DC offset. The calculated upper 1002 and lower 1004 envelopes as well as the estimated DC offset path 1006 are shown. In FIG. 11, there is shown a graph highlighting the results of using the DC offset path estimation technique on a sinusoid-like DC offset. The calculated upper 1102 and lower 1104 envelopes as well as the estimated DC offset path 1106 are shown. As can be seen, the offset path estimation technique of the present invention provides very good estimation, for different types of DC-offset profiles.

The DC-offset path estimation and removal described above is well fitted to solve the time-varying DC-offset problem associated with direct conversion receivers, under AM suppression test conditions such as those test conditions defined by the GSM standard at section 5.2 (GSM 05.05) and section 14.8.1 (GSM 11.10).

While the preferred embodiments of the invention have been illustrated and described, it will be clear that the invention is not so limited. As previously mentioned the present invention can not only be used in GSM systems but can also be used for other communication systems. Numerous modifications, changes, variations, substitutions and equivalents will occur to those skilled in the art without departing from the spirit and scope of the present invention as defined by the appended claims.

What is claimed is:

1. A method for estimating and removing a DC-offset from a signal, the method characterized by the steps of:

(a) dividing the signal into a plurality of blocks;

(b) determining the maximum and minimum values of the signal in each of the blocks;

(c) estimating the upper envelope of the signal using the maximum values determined in step (b);

(d) estimating the lower envelope of the signal using the minimum values determined in step (b); and (e) calculating a DC-offset path by taking the average of the upper and lower envelopes.

2. A method as defined in claim 1, further including the step of:

(f) subtracting the DC-offset path calculated in step (e) from the signal in order to remove the DC-offset from the signal.

3. A method as defined in claim 1, wherein the signal received is a "Gaussian Minimum Shift Keying (GSMK)" signal received in bursts and each burst is divided into a plurality of blocks.

4. A method as defined in claim 1, wherein some of the plurality of blocks have different sizes.

5. A method as defined in claim 3, wherein the size of blocks located at the burst boundaries is different than the size of the blocks located at the middle of the burst.

6. A method as defined in claim 1, wherein the size of the plurality of blocks is chosen so that the size of the blocks is larger than the maximum number of consecutive equal-valued samples of the received signal.

7. A method as defined in claim 2, wherein prior to performing step (f) the DC-offset path is filtered.

8. A method as defined in any one of claims 1–7, wherein step (c) comprises the sub-steps of:

(c1) storing the maximum values of the signals in each of the plurality of blocks in an array;

for each pair of consecutive maximum values from the array with the smaller value (max1) and the larger value (max2) of the pair define a threshold value (currentMax) and set it equal to the smaller value (max1) from amongst the pair, and for each sample between the smaller value (max1) and the larger value (max2), starting at the smaller value (max1) and moving towards (max2), perform the following further steps;

(c2) comparing each sample with the threshold value (currentMax);

(c3) setting the threshold value (currentMax) to the value of the sample if the sample is bigger than the threshold value (currentMax);

(c4) setting the value of an instantaneous upper envelope (vInstMax) at that sample position equal to the threshold value (currentMax).

9. A method as defined in any one of claims 1–7, wherein step (d) comprises the sub-steps of:

(d1) storing the minimum values of the signal in each of the plurality of blocks in an array;

for each pair of consecutive minimum values from the array with the larger value (min1) and the smaller value (min2) of the pair define a threshold value (currentMin) and set it equal to the larger value (min1) from amongst the pair, and for each sample between the larger value (min1) and the smaller value (min2), starting at the larger value (min1) and moving towards the smaller value (min2), perform the following further steps;

(d2) comparing each sample with the threshold value (currentMin);

(d3) setting the threshold value (currentMin) to the value of the sample if the sample is smaller than the threshold value (currentMin);

(d4) setting the value of an instantaneous lower envelope (vInstMin) at that sample position equal to the threshold value (currentMin).

* * * * *